(12) United States Patent
Kling

(10) Patent No.: US 12,283,825 B2
(45) Date of Patent: Apr. 22, 2025

(54) CHARGING DEVICE FOR INDUCTIVELY CHARGING A BATTERY OF A MOBILE TERMINAL

(71) Applicant: Dr. Ing. h.c. F. Porsche Aktiengesellschaft, Stuttgart (DE)

(72) Inventor: Achim Kling, Neuweiler-Agenbach (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 2 days.

(21) Appl. No.: 18/213,987

(22) Filed: Jun. 26, 2023

(65) Prior Publication Data

US 2024/0055896 A1 Feb. 15, 2024

(30) Foreign Application Priority Data

Aug. 9, 2022 (DE) ...................... 10 2022 120 017.5

(51) Int. Cl.
*H02J 50/12* (2016.01)
*B60H 1/00* (2006.01)
(Continued)

(52) U.S. Cl.
CPC .......... *H02J 50/12* (2016.02); *B60H 1/00271* (2013.01); *B60R 16/03* (2013.01); *H02J 7/0044* (2013.01); *B60H 2001/003* (2013.01)

(58) Field of Classification Search
CPC .......... H02J 50/12; H02J 7/0044; H02J 50/10; H02J 7/0042; H02J 7/0045; H02J 50/80; B60H 1/00271; B60H 2001/003; B60H 1/00564; B60H 1/34; B60R 16/03; H05K 5/0213; H05K 7/2089; H05K 7/20909
See application file for complete search history.

(56) References Cited

U.S. PATENT DOCUMENTS 10,782,752 B2 * 9/2020 Koo ...................... H02J 7/0042
2018/0198313 A1 * 7/2018 Lee ......................... H02J 50/60
(Continued)

FOREIGN PATENT DOCUMENTS

DE 10201800046 5/2019
DE 102019215267 4/2021

OTHER PUBLICATIONS

German Search Report dated Apr. 20, 2023.

*Primary Examiner* — Jared Fureman
*Assistant Examiner* — Michael J Warmflash
(74) *Attorney, Agent, or Firm* — Gerald E. Hespos; Michael J Porco

(57) ABSTRACT

A charging device (2) for inductively charging a battery of a mobile terminal (4) for arrangement within a motor vehicle (100), has a storage unit (6) with a storage surface (6a) where the mobile terminal (4) can be placed during a charging process. A charging unit (8) is arranged in the storage unit (6) below the storage surface (6a) for inductively charging the battery of the mobile terminal (4). A coupling unit (10) is provided for coupling the charging device (2) to an air-conditioning device (12) of the motor vehicle (100) for introducing cooling air from the air-conditioning device (12) into the charging device (2). Air inlet openings (14) are arranged within the storage surface (6a) of the storage unit (6) for introducing the cooling air from the air-conditioning device (12) via the coupling unit (10) to the charging unit (8).

12 Claims, 3 Drawing Sheets

(51) Int. Cl.
 *B60R 16/03* (2006.01)
 *H02J 7/00* (2006.01)

(56) References Cited

U.S. PATENT DOCUMENTS

| | | |
|---|---|---|
| 2018/0224909 A1* | 8/2018 | Koo .................. H02J 50/10 |
| 2019/0014683 A1* | 1/2019 | Han .................. H02J 50/10 |
| 2019/0249697 A1* | 8/2019 | Liu .................... F16B 2/185 |
| 2020/0186181 A1* | 6/2020 | Boundy ............. H04B 1/3883 |
| 2021/0050741 A1* | 2/2021 | Pinkos ............... H01F 27/025 |

* cited by examiner

CHARGING DEVICE FOR INDUCTIVELY CHARGING A BATTERY OF A MOBILE TERMINAL

CROSS REFERENCE TO RELATED APPLICATION

This application claims priority on German Patent Application No 10 2022 120 017.5 filed Aug. 9, 2022, the entire disclosure of which is incorporated herein by reference.

BACKGROUND

Field of the Invention

The invention relates to a charging device for inductively charging a battery of a mobile terminal, such as a handheld mobile device. The invention also relates to a system that comprises both the charging device and the mobile device and to motor vehicle comprising such a charging device.

Related Art

Charging devices have been incorporated into motor vehicles for inductively charging a battery of a mobile terminal, such as a handheld mobile device. In particular, the prior art includes high-performance inductive charging devices that allow for fast charging times despite a wireless connection.

A disadvantage of known high-performance inductive charging devices relates to the large amount heat generation during a charging process. The resulting heat harms both the charging devices and the mobile terminals to be charged. Approaches to counteract this problem use specific charging strategies or integrated cooling systems. However, these approaches are associated with further disadvantages. For example, known heat reducing charging strategies lead to an extension of the charging duration. Additionally, the integration of a cooling system increases space requirements and costs.

Therefore, objects the invention are to provide a compact charging device that can be implemented in a simple and cost-efficient manner for inductively charging a battery of a mobile terminal in a short time without damaging the charging device or the mobile terminal.

SUMMARY OF THE INVENTION

Technical features and details disclosed herein with respect to the charging device also apply to the system and the motor vehicle of the invention, and vice versa. Thus, reference is or can always be made mutually with respect to the disclosure regarding the individual aspects of the invention.

One aspect of the invention relates to a charging device that can be arranged in a motor vehicle for inductively charging a battery of a mobile terminal, such as a handheld mobile device. The charging device comprises a storage unit having a storage surface where the mobile terminal can be placed during a charging process. A charging unit is arranged within the storage unit below the storage surface for inductively charging the battery of the mobile terminal. A coupling unit is provided for coupling the charging device to an air-conditioning device of a motor vehicle for introducing cooling air from the air-conditioning device into the charging device. The charging device also has air inlet openings arranged in the storage surface of the storage unit for introducing the cooling air from the air-conditioning device via the coupling unit to the charging unit.

The charging device therefore can charge a battery of a mobile terminal in a fast and device-sparing manner. The charging device also is compact and can be manufactured simply and inexpensively. The functionality of the charging device and the interaction of the individual components is explained in greater detail below.

Coupling the charging device to an air-conditioning device of the motor vehicle introduces cooling air from the air-conditioning device into the charging device to cool a charging unit for inductive charging of a battery of a mobile terminal during a charging process without integrating additional cooling systems into the charging device. Thus, the charging device provides an inexpensive and compact design and achieves a fast charging. The air inlet openings arranged in the storage surface of the storage unit introduce cooling air from the air-conditioning device for cooling both the charging unit and the mobile terminal.

A mobile terminal in the context of the invention is understood to mean a portable communication device, such as a smart phone, a tablet, a smart watch, an ultrabook, or the like. A coupling unit for coupling the charging device to an air-conditioning device of the motor vehicle can be understood to mean a component that is arranged between a charging device and an air-conditioning device, preferably connecting the air-conditioning device to the charging device. The air inlet openings in the storage surface of the storage unit can introduce cooling air into the storage unit and along the mobile terminal to be charged and can be round, oval, rectangular, or differently shaped recesses. It is understood that air inlet openings at other positions of the storage unit, e.g. on a front side, can also be arranged opposite an air-conditioning device of a motor vehicle so that the cooling air from the air-conditioning device can be introduced via the air inlet openings arranged on the front side. The charging device can be used in a motor vehicle and can be arranged there, either releasably or removably, or can be firmly integrated and fixed. It is understood that the charging device according to the invention can be used not only in motor vehicles, such as passenger cars or trucks, but also in tractors, trains, aircraft, or ships.

The charging unit of some embodiments comprises at least one transmitter coil for charging the battery of the mobile terminal. The charging unit may be configured such that the battery of the mobile terminal is rechargeable by a resonant inductive coupling, preferably by means of Qi. In the context of a resonant inductive coupling, in particular via Qi, data can be exchanged between the transmitter and the receiver to ensure an optimal energy transmission. The transmitter can modulate the transmission in the field, and the receiver can use, for example, an RFID-like technique for transmitting the data to the transmitter. The typically high magnetic coupling of the coils, enables a high power to be transmitted.

A fan can be provided for particularly effective heat removal from the charging device. The fan can be arranged within the storage unit below the storage surface. The fan can provide a better distribution of a cooling power within the storage unit and particularly along the charging unit and/or the mobile terminal.

The storage surface of some embodiments has a size of at least 16×8 cm, preferably at least 18×10 cm. Such a size of a storage surface accommodates most common types of smart phones without taking up too large of a space.

In some embodiments, the coupling unit for coupling the charging device to an air-conditioning device of the motor vehicle is arranged on an end of the charging device. Thus, the coupling unit may be connected directly to a connecting element of the air-conditioning device of the motor vehicle. The adjustable design of a coupling unit enables different types of storage units or charging units to be connected with different types of air-conditioning devices to provide a flexible arrangement, in particular for retrofitting a charging device. The connecting element discussed here can be configured, for example, as a cooling hose or also as an injection molded part, for example in the form of a shell or the like.

In the context of a flexible arrangement, it is contemplated in particular that the coupling unit for coupling the charging device to an air-conditioning device of the motor vehicle is configured in two parts. For example, the coupling unit may comprise a vent arranged on an end and a housing for connection to the connecting element. Thus, it is possible to design a first part specifically for a storage unit or charging unit and to design the other part for the air-conditioning device or connecting element.

Some embodiments have a cooling channel arranged within the storage unit for guiding an air stream along the charging unit and removing heat from the charging device. The cooling channel may comprise cooling fins and may be connected to the air outlet openings of the storage surface. A cooling channel can ensure a particularly targeted flow for cooling and can be formed from aluminum or copper for efficient heat transfer.

The storage unit of some embodiments has fixation elements to enable a damage-resistant fixation and accommodation of the mobile terminal on the storage surface of the storage unit while charging the mobile terminal. The fixation elements may be arranged on the storage surface and may be configured as slidable and lockable spring elements.

This disclosure also relates to a system for inductively charging a battery of a mobile terminal for arrangement within a motor vehicle. The system includes a charging device as described above as well as an air-conditioning device for generating cooling air for air-conditioning the motor vehicle. The system offers the same advantages as have been described above with respect to the charging device.

The air-conditioning device of some embodiments is configured to be stable, flexibly positionable and retrofittable. Accordingly, the air-conditioning device of the system may be mounted on a carrier of a control panel and may comprise an adapter element for mounting on the carrier. The adapter element of some embodiments is formed in two parts and is connected to the connecting element via a cooling pipe. The cooling pipe may have a straight connection.

This disclosure also relates to a motor vehicle comprising a charging device as described above as well as a system as described above. The motor vehicle thus has the same advantages as described above with respect to the charging device and the system.

Further advantages, features, and details of the invention arise from the following description, in which an embodiment is described in detail with reference to the drawings.

DETAILED DESCRIPTION

Figure 1:
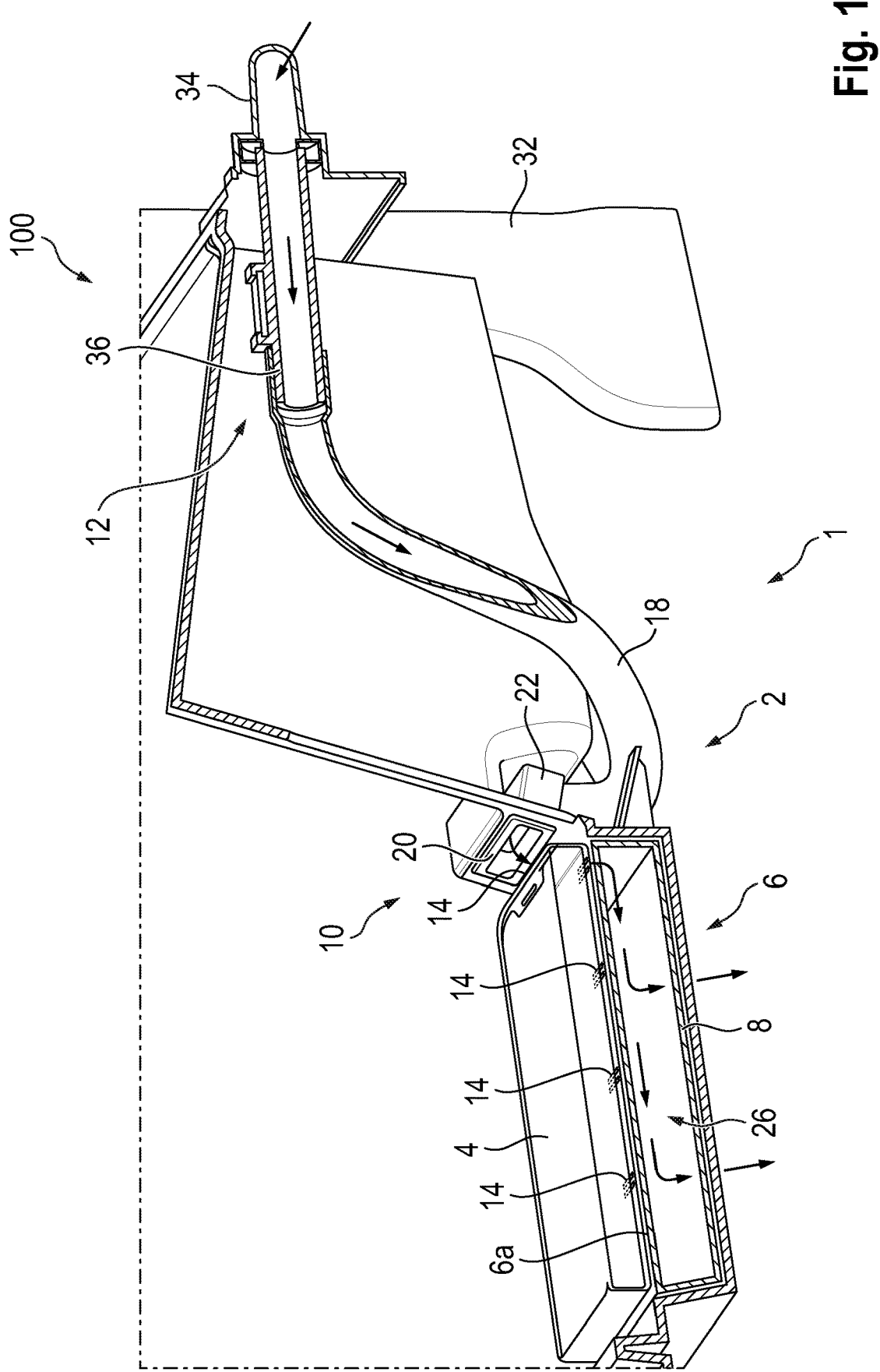
FIG. 1 is a perspective view of an embodiment of a system for inductively charging a battery of a mobile terminal for arrangement within a motor vehicle

A system for inductively charging a battery is identified generally by the numeral 1 in FIG. 1. The battery is part of a mobile terminal 4, such as a portable communication device, a smart phone, a tablet, a smart watch, an ultrabook, or the like. The system 1 is incorporated into a motor vehicle 100 and comprises a charging device 2 that can be placed in direct communication with an air-conditioning device 12 that generates cooling air for air-conditioning the motor vehicle 100.

The charging device 2 discussed here comprises a storage unit 6 having a storage surface 6a where the mobile terminal 4 can be placed during a charging process. A charging unit 8 is arranged within the storage unit 6 below the storage surface 6a for inductively charging the battery of the mobile terminal 4. A coupling unit 10 couples the charging device 2 to an air-conditioning device 12 of the motor vehicle 100 for introducing cooling air from the air-conditioning device 12 into the charging device 2. Air outlet openings 14 are arranged within the storage surface 6a of the storage unit 6 for introducing the cooling air from the air-conditioning device 12 via the coupling unit 10 to the charging unit 8.

As shown in FIG. 1, the coupling unit 10 for coupling the charging device 2 to an air-conditioning device 12 of the motor vehicle 100 is arranged on an end of the charging device 2. The coupling unit 10 is connected directly to a connecting element 18. The connecting element 18 can be configured, for example, as a cooling hose or an injection molded part, for example in the form of a shell.

The coupling unit 10 for coupling the charging device 2 to an air-conditioning device 12 of the motor vehicle 100 is configured in two parts, namely a vent 20 arranged on an end and a housing 22 for connection to the connecting element 18 of the air-conditioning device 12.

A cooling channel 26 is arranged within the storage unit 6 for guiding an air stream along the charging unit 8. The cooling channel 26 may comprise cooling fins and is connected to the air outlet openings 14 of the storage surface 6a. A fan 28 can be provided for particularly effective heat removal from the charging device and from the cooling channel 26. The fan 28 can be arranged to communicate with a lower part of the cooling channel 26 and at an end remote from the vent 20.

As shown in FIG. 1, the air-conditioning device 12 is mounted on a carrier 32 of a control panel and comprises a two-piece adapter 34 for mounting on the carrier 32. The adapter 34 is connected to the connecting element 18 via a cooling pipe 36.

Figure 2:
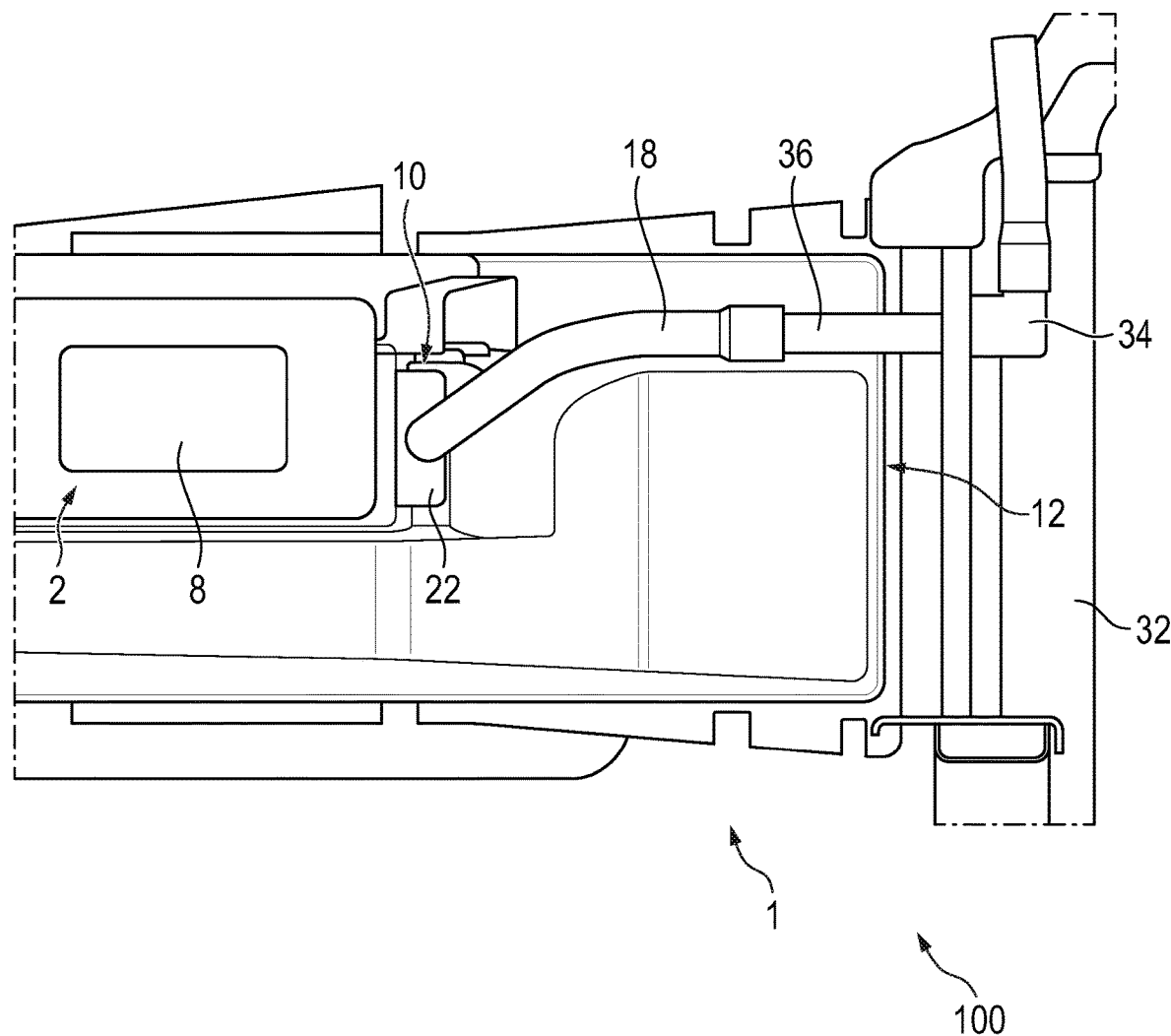
FIG. 2 is a bottom plan view of the system of FIG. 1.

FIG. 2 is a bottom view of the system 1 for inductive charging of a battery of a mobile terminal 4.

Figure 3:
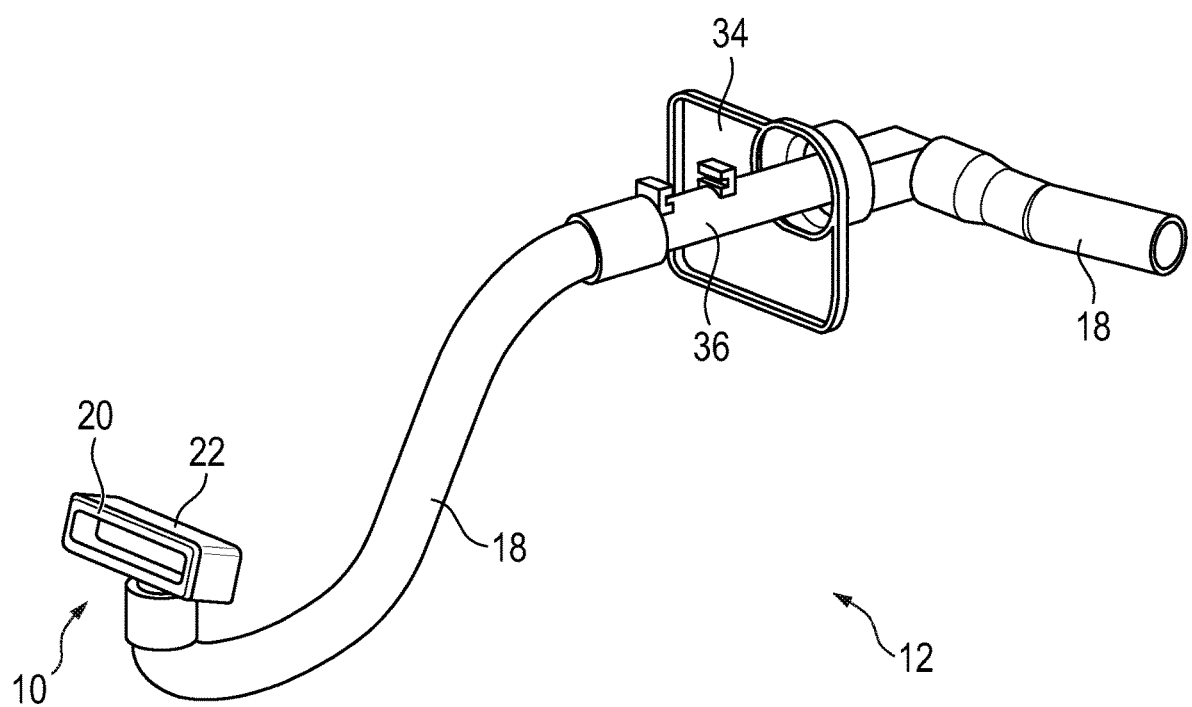
FIG. 3 is a perspective view of an air-conditioning device for arrangement in the system of FIGS. 1 and 2.

FIG. 3 shows a part of an air-conditioning device 12 for arrangement in the system 1 according to the invention for inductive charging a battery of a mobile terminal 4.

The embodiments described above are presented solely in the context of examples. Individual features of embodiments can be combined with one another, if technically meaningful, without departing from the scope of the invention.

The invention claimed is:

1. A charging device (2) for inductively charging a battery of a mobile terminal (4) for arrangement within a motor vehicle (100) that has an air-conditioning device (12) for cooling the motor vehicle (100), the charging device (2) comprising:

a storage unit (6) having a storage surface (6a) where the mobile terminal (4) can be placed during a charging process;

a charging unit (8) arranged within the storage unit (6) below the storage surface (6a) for inductively charging the battery of the mobile terminal (4) when the mobile terminal is placed on the storage surface (6a); and a coupling unit (10) for coupling the charging device (2) to the air-conditioning device (12) of the motor vehicle (100) for introducing cooling air from the air-conditioning device (12) of the motor vehicle into the charging device (2), wherein air outlet openings (14) are arranged within the storage surface (6a) of the storage unit (6) for introducing the cooling air from the air-conditioning device (12) of the vehicle via the coupling unit (10) to the charging unit (8).

2. The charging device (2) of claim 1, wherein the charging unit (8) is configured such that the battery of the mobile terminal (4) can be charged by a resonant inductive coupling.

3. The charging device (2) of claim 1, further comprising a fan for removal of heat from the charging device (2), wherein the fan is arranged within the storage unit (6) below the storage surface (6a).

4. The charging device (2) of claim 1, wherein the storage surface (6) has a size of at least 16×8 cm.

5. The charging device (2) of claim 1, wherein the coupling unit (10) is on an end of the charging device (2) and is connected directly to a connecting element (18) of the air-conditioning device (12).

6. The charging device (2) of claim 5, wherein the coupling unit (10) comprises a vent (20) arranged on one end and a housing (22) arranged on an opposite end and configured for connection to the connecting element (18).

7. The charging device (2) of claim 1, further comprising a cooling channel (26) arranged within the storage unit (6) for guiding an air stream along the charging unit (8), the cooling channel (26) being connected to the air outlet openings (14) of the storage surface (6a).

8. The charging device (2) of claim 1, wherein the storage unit (6) comprises fixation elements for fixing the mobile terminal (4), the fixation elements are arranged on the storage surface (6a) and are configured in particular as slidable and lockable spring elements.

9. A motor vehicle (100) comprising:
an air-conditioning device (12) for generating cooling air for the motor vehicle (100); and a charging device (2) for inductively charging a battery of a mobile terminal (4), the charging device (2) including a storage unit (6) having a storage surface (6a) where the mobile terminal (4) can be placed during a charging process, a charging unit (8) arranged within the storage unit (6) below the storage surface (6a) for inductively charging the battery of the mobile terminal (4), air outlet openings (14) being formed in the storage surface (6a) of the storage unit (6);

a connecting element (18) defining a pipe having an inlet end connected the air-conditioning device (12) and an outlet end spaced from the air-conditioning device (12); and a coupling unit (10) spaced from the air-conditioning device (12) and connected to the outlet end of the connecting element (18), the coupling unit (10) coupling the charging device (2) to the air-conditioning device (12) of the motor vehicle (100) for introducing cooling air from the air-conditioning device (12) into the charging device (2) and through the outlet openings (14) for cooling the charging device (2) and the mobile terminal (4) placed on the storage surface (6a) for charging, wherein the connecting element (18) carries the cooling air produced by the air-conditioning device (12) directly to the coupling unit (10) so that the coupling unit (10) can introduce the cooling air into the charging device (2) and through the outlet openings (14) for cooling the charging device (2) and the mobile terminal (4) placed on the storage surface (6a).

10. The motor vehicle (100) of claim 9, further comprising a control panel with a carrier (32), the air-conditioning device (12) being mounted on the carrier (32) of the control panel, the air-conditioning device (12) comprises an adapter element (34) mounted on the carrier (32) and being connected to inlet end of the connecting element (18).

11. The motor vehicle (100) of claim 9, wherein the coupling unit (10) comprises a vent (20) arranged on one end and a housing (22) arranged on an opposite end and configured for connection to the outlet end of the connecting element (18).

12. The motor vehicle (100) of claim 11, further comprising a cooling channel (26) arranged within the storage unit (6) for guiding an air stream along the charging unit (8), the cooling channel (26) being connected to the air outlet openings (14) of the storage surface (6a).

* * * * *